United States Patent
Hahn et al.

(10) Patent No.: US 10,846,739 B1
(45) Date of Patent: Nov. 24, 2020

(54) SYSTEM AND METHOD FOR STRATEGIZING AND EXECUTING MARKETING CAMPAIGNS

(71) Applicant: IQVIA, INC., Parsippany, NJ (US)

(72) Inventors: Christopher Hahn, Seattle, WA (US); Cassie Wallender, Seattle, WA (US); Brian Caruso, Seattle, WA (US); Saqib Rokadia, Seattle, WA (US); Stephen Sisk, Seattle, WA (US)

(73) Assignee: IQVIA, INC.

( * ) Notice: Subject to any disclaimer, the term of this patent is extended or adjusted under 35 U.S.C. 154(b) by 451 days.

(21) Appl. No.: 14/136,952

(22) Filed: Dec. 20, 2013

Related U.S. Application Data

(60) Provisional application No. 61/909,607, filed on Nov. 27, 2013.

(51) Int. Cl.
*G06Q 30/02* (2012.01)

(52) U.S. Cl.
CPC ..... *G06Q 30/0251* (2013.01); *G06Q 30/0242* (2013.01); *G06Q 30/0245* (2013.01); *G06Q 30/0264* (2013.01)

(58) Field of Classification Search
CPC .................................................. G06Q 30/0264
USPC .......................................................... 705/14
See application file for complete search history.

(56) References Cited

U.S. PATENT DOCUMENTS

| | | | | |
|---|---|---|---|---|
| 8,521,579 | B2 * | 8/2013 | Witting | 705/7.31 |
| 9,177,321 | B2 * | 11/2015 | Seifert | G06F 17/3089 |
| 2001/0001863 | A1 * | 5/2001 | Shuster | G06F 17/30873 709/203 |
| 2003/0078830 | A1 * | 4/2003 | Wagner et al. | 705/10 |
| 2004/0088208 | A1 * | 5/2004 | H. Runge et al. | 705/10 |
| 2004/0215501 | A1 * | 10/2004 | d'Ornano | G06Q 30/02 705/7.29 |
| 2006/0026166 | A1 * | 2/2006 | Sattler et al. | 707/10 |
| 2007/0022003 | A1 * | 1/2007 | Chao | G06Q 30/02 705/14.46 |

(Continued)

OTHER PUBLICATIONS

Bolcer, Gregory Alan, Flexible and Customizable Workflow Execution on the WWW, 1998, University of California, Irvine, ProQuest Dissertations Publishing (Year: 1998).*

*Primary Examiner* — Matthew L Hamilton
(74) *Attorney, Agent, or Firm* — John Maldjian; Maldjian Law Group LLC

(57) ABSTRACT

Some implementations may provide a method for conducting a marketing campaign, including: providing a user interface to a marketing professional; receiving, via the interface, input from the marketing professional prescribing a sequence of at least three steps for engaging at least one target customer, the sequence comprising: a start step corresponding to a beginning point for the at least one target customer to enter into the sequence, at least one end step corresponding to a finishing line for the at least one target customer to complete the sequence, at least one step for communicating information to the at least one target customer for the at least one target customer to progress through the sequence; subsequent to determining that the sequence of steps is valid, receiving an instruction from the marketing professional to launch the sequence; and in response to the received instruction, launching the sequence to conduct the marketing campaign.

19 Claims, 23 Drawing Sheets

(56) References Cited

U.S. PATENT DOCUMENTS

| | | | |
|---|---|---|---|
| 2008/0033811 A1* | 2/2008 | Brown | G06Q 30/02 705/14.66 |
| 2008/0059295 A1* | 3/2008 | Schauser | G06Q 10/06 705/14.44 |
| 2008/0091774 A1* | 4/2008 | Taylor et al. | 709/203 |
| 2008/0097928 A1* | 4/2008 | Paulson | 705/80 |
| 2008/0270240 A1* | 10/2008 | Chu | G06Q 10/06375 705/14.11 |
| 2009/0193453 A1* | 7/2009 | Cansler | H04N 21/4331 725/32 |
| 2009/0216647 A1* | 8/2009 | Kamangar | G06Q 30/02 705/14.36 |
| 2010/0100418 A1* | 4/2010 | Richter | G06Q 30/02 705/7.32 |
| 2012/0116868 A1* | 5/2012 | Chin | G06Q 30/0203 705/14.43 |
| 2012/0296691 A1* | 11/2012 | Ethier et al. | 705/7.27 |
| 2013/0054303 A1* | 2/2013 | Chourey | 705/7.29 |
| 2013/0073377 A1* | 3/2013 | Heath | G06Q 30/02 705/14.39 |
| 2014/0006205 A1* | 1/2014 | Berry | G06Q 30/0641 705/26.7 |
| 2014/0143017 A1* | 5/2014 | Kannan | G06Q 30/0203 705/7.32 |
| 2014/0279060 A1* | 9/2014 | Memarian et al. | 705/14.72 |
| 2014/0344058 A1* | 11/2014 | Brown | G06Q 30/0261 705/14.58 |
| 2015/0006277 A1* | 1/2015 | Delug | G06Q 30/0244 705/14.43 |
| 2018/0089701 A1* | 3/2018 | Wu | G06Q 30/02 |
| 2019/0347585 A1* | 11/2019 | Mowatt | G06Q 10/0633 |

\* cited by examiner

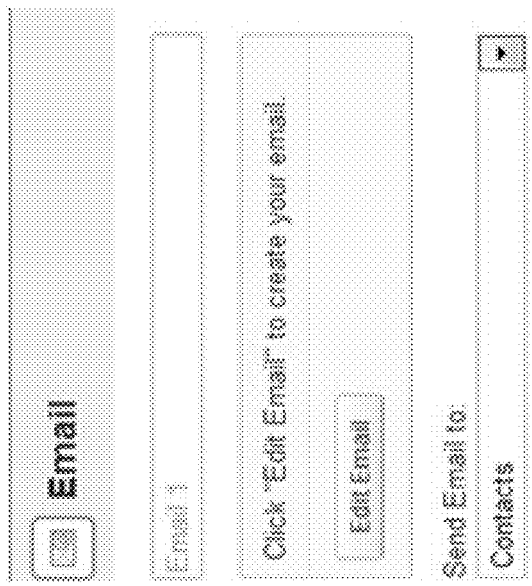
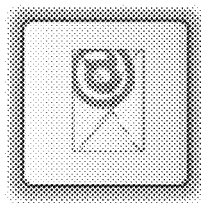
FIG. 8

SYSTEM AND METHOD FOR STRATEGIZING AND EXECUTING MARKETING CAMPAIGNS

CROSS-REFERENCE TO RELATED APPLICATIONS

This application claims priority to U.S. Provisional Application Ser. No. 61/909,607, filed on Nov. 27, 2013 and entitled "SYSTEM AND METHOD FOR STRATEGIZING AND EXECUTING MARKETING CAMPAIGNS," the contents of which are herein incorporated by reference.

BACKGROUND

Marketing campaigns are frequently conducted by marketing personnel to promote business, for example, in health sciences.

OVERVIEW

In one aspect, some implementations provide a computer-implemented method for conducting a marketing campaign. The method includes: providing a user interface to a marketing professional; receiving, via the interface, input from the marketing professional prescribing a sequence of at least three steps for engaging at least one target customer, the sequence comprising: a start step corresponding to a beginning point for the at least one target customer to enter into the sequence, at least one end step corresponding to a finishing line for the at least one target customer to complete the sequence, at least one step for communicating information to the at least one target customer for the at least one target customer to progress through the sequence; subsequent to determining that the sequence of steps is valid, receiving an instruction from the marketing professional to launch the sequence; and in response to the received instruction, launching the sequence to conduct the marketing campaign.

Implementations may include one or more of the following features. Some implementations may further include: receiving, via the interface, input from the marketing professional introducing a loop to the sequence. Some implementations may further include receiving, via the interface, input from the marketing professional introducing a decision branch to the sequence. In one configuration, the method may additionally include: receiving, via the interface, input from the marketing professional introducing a decision branch based on at least one survey response to the sequence. Some implementations may include: receiving, via the interface, input from the marketing professional introducing a parallel branch to the sequence. Some implementations may include: receiving, via the interface, input from the marketing professional adding one or more steps to the sequence. Some implementations may further include: receiving, via the interface, input from the marketing professional removing one or more steps from the sequence.

Some implementations may further include: determining that the sequence of steps is complete and valid. Determining that the sequence of steps is complete and valid comprises: checking each step of the sequence for missing or invalid information.

In another aspect, some implementations may provide a computer system, comprising at least one processor, wherein the at least one processor is configured to perform the operations of: providing a user interface to a marketing professional; receiving, via the interface, input from the marketing professional prescribing a sequence of at least three steps for engaging at least one target customer, the sequence comprising: a start step corresponding to a beginning point for the at least one target customer to enter into the sequence, at least one end step corresponding to a finishing line for the at least one target customer to complete the sequence, at least one step for communicating information to the at least one target customer for the at least one target customer to progress through the sequence; subsequent to determining that the sequence of steps is complete and valid, receiving an instruction from the marketing professional to launch the sequence; and in response to the received instruction, launching the sequence to conduct the marketing campaign.

In some implementations, the operations may further include: receiving, via the interface, input from the marketing professional introducing a loop to the sequence. In some implementations, the operations may further include: receiving, via the interface, input from the marketing professional introducing a decision branch to the sequence. In one configuration, the operations may further include: receiving, via the interface, input from the marketing professional introducing a decision branch based on at least one survey response to the sequence. In some implementations, the operations may further include: receiving, via the interface, input from the marketing professional introducing a parallel branch to the sequence. In some implementations, the operations may further include: receiving, via the interface, input from the marketing professional adding one or more steps to the sequence. In some implementations, the operations may further include: receiving, via the interface, input from the marketing professional removing one or more steps from the sequence.

In some implementations, the operations may further include: determining that the sequence of steps is complete and valid. In one configuration, determining that the sequence of steps is complete and valid may include checking each step of the sequence for missing or invalid information.

In yet another aspect, some implementations may provide a computer-readable medium comprising software instructions that, when executed by a computer, causes the computer to perform the operations of providing a user interface to a marketing professional; receiving, via the interface, input from the marketing professional prescribing a sequence of at least three steps for engaging at least one target customer, the sequence comprising: a start step corresponding to a beginning point for the at least one target customer to enter into the sequence, at least one end step corresponding to a finishing line for the at least one target customer to complete the sequence, at least one step for communicating information to the at least one target customer for the at least one target customer to progress through the sequence; subsequent to determining that the sequence of steps is complete and valid, receiving an instruction from the marketing professional to launch the sequence; and in response to the received instruction, launching the sequence to conduct the marketing campaign.

Implementations may include one or more of the following features. In some implementations, the operations may further include: receiving, via the interface, input from the marketing professional introducing a decision branch based on at least one survey response to the sequence.

In still another aspect, some implementations may provide computer-implemented method for conducting a marketing campaign, comprising: receiving data encoding a sequence of steps for interacting with at least one target customer, the sequence comprising: a start step corresponding to a beginning point for at least one target customer to enter into the sequence, at least one end step corresponding to a finishing line for the at least one target customer to complete the sequence, at least one step for communicating information to the at least one target customer for the at least one target customer to progress through the sequence; receiving information from a target customer; determining whether the target customer has met a criteria for entering into the sequence of steps; in response to determining that the target customer has met the criteria for entering into the sequence, generating data encoding status information of the target customer; and administering the sequence of steps so that the data encoding status information of the target customer flows with the target customer as the target customer progresses through the sequence of steps.

Implementations may include one or more of the following features. Some implementations may further include: generating a status report of the target customer based on the status information of the target customer at a particular time during the target customer's progress through the sequence of steps. In one configuration, the method may further include: presenting the status report by displaying the status report at the particular time during the target customer's progress through the sequence of steps.

Some implementations may further include: generating a summary status report based on the status information of one or more target customers. In one configuration, the method may further include: presenting the generated summary status report to a marketing professional.

Some implementations may further include determining that the sequence of steps is complete and valid. In one configuration, determining that the sequence of steps is complete and valid may further include: checking each step of the sequence for missing or invalid information.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 8 shows an example email step for a Journey according to some implementations.

DETAILED DESCRIPTION

Figure 1:
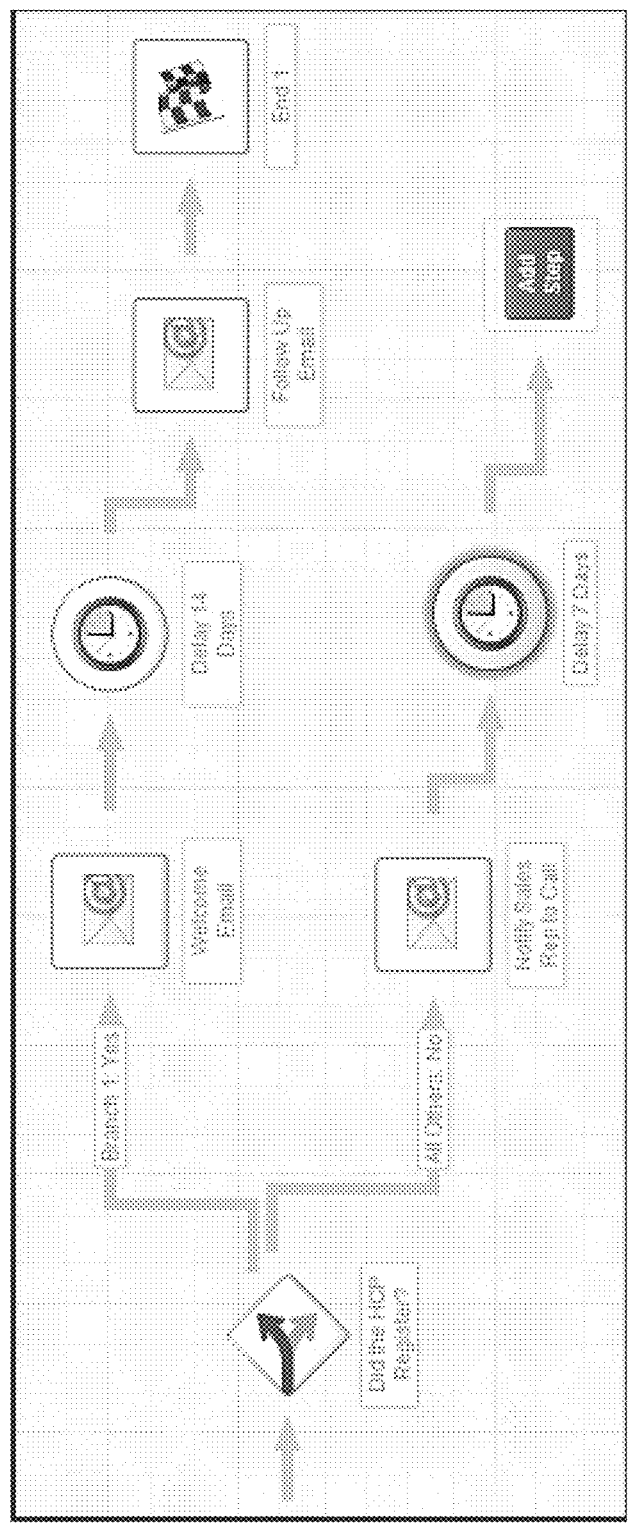
FIG. 1 shows an example Journey diagram being designed according to some implementations.

This disclosure generally describes a system and method for strategizing and executing marketing campaigns. The system, known as "Journey" as disclosed herein, refers to a voyage to be undertaken by a customer targeted by a marketing campaign. Here, voyage is being used rather metaphorically to connote a sequence of communications or interactions with the customer being targeted. A Journey may enable marketers to generate a flow diagram describing how they want a customer of theirs to progress through stages of communication and interaction based on an initial triggering condition. Implementations disclosed herein may make it possible to create, monitor, and report on an interactive, automated, and visual layout of a marketing campaign strategy that acts on data within the system in predetermined ways at specific steps within the flow. When a trigger condition is met, for example, when a physician registers at a website, a piece of data known as a "Traveler" moves forward through the Journey. Once again, "Traveler" is being used metaphorically to refer to a target customer taking on a voyage during a marketing campaign. Most often that piece of data known as the "Traveler" is a contact record, but Journey Travelers are not limited to contact records. A Traveler could be any custom data entity within the system. The Travelers may travel down a path from the start, when the trigger condition is met, to the end of the Journey, and may traverse several prescribed steps in between in the order of the path they travel along. The traversal may include a side branch, wherein the Traveler experiences a parallel operation. The traversal may also include a loop, wherein the Traveler waits on a condition. When a Traveler encounters a step in the Journey, some predetermined action is taken, based on the attributes of the Traveler and the step. For example, an email sent to the physician. The path the Traveler takes along the Journey may vary based on attributes of the Traveler, as decision points within the Journey allow the automated flows to split into various branches. Such variation allows for complex multi-year marketing strategies to be laid out in advance and left to run automatically, as new Travelers satisfy the triggering conditions, start the Journey, and run it to completion.

"Journeys" is a piece of software with a visual, drag-and-drop campaign creation capability, that enables the creation of powerful and highly scalable multi-stage Marketing Campaigns based on integrated customer data. "Journeys" can include sophisticated decision branching and looping, sending Targets down separate paths based on properties of the contact record used as a Traveler, such as URL clicks. At a basic level, the Journey enables a marketer to send an email based on a triggering action, wait a specified time, and then send another. The Journey also provides advanced decision branching capabilities and a new visual drag-and-drop graphical interface for easy creation of powerful and highly scalable multi-stage marketing campaigns based on integrated customer data. Other features may include segment-based filtering, multi-channel marketing including personalized e-mail delivery, logical branching and looping, time-based delays, visual monitoring of each step in the Journey, and an graphical drag-and-drop interface for constructing workflows.

FIG. 1 shows an example Journey diagram being designed according to some implementations.

Figure 2:
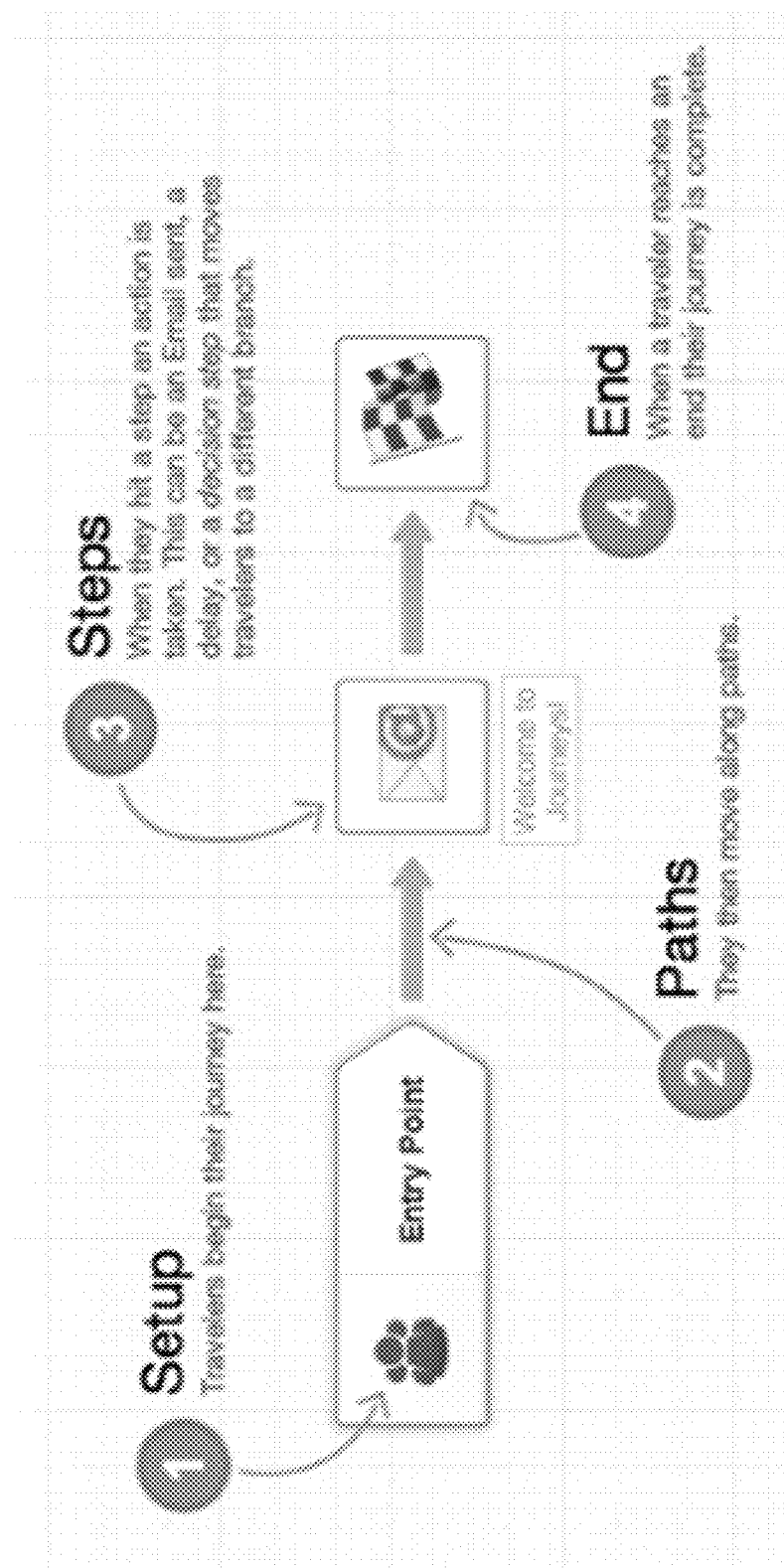
FIG. 2 illustrates example components of a Journey being designed for a marketing campaign according to some implementations.

FIG. 2 illustrates example components of a Journey being designed for a marketing campaign according to some implementations. As illustrated, each Journey includes an Entry Point (known as the Start), a series of Steps, and one or more Ends. Steps are connected with Paths, and a Journey may be considered as a series of Steps and Paths a Target would take to get from the Start to an End.

Specifically, the main components of a Journey always start with a starting trigger step and include the following other types of action steps connected by paths:
Data Manipulation
Email
SMS
Surveys
Decisions
Delays
End Steps Generally, each step has an activity reporting capability to show the identity of Travelers were processing through a step along with the corresponding the timestamp. The "Travelers Bag" is a Journey element that builds on one another and utilizes data that has been changed during the Journey, or records that have been created during the Journey.

Figure 3:
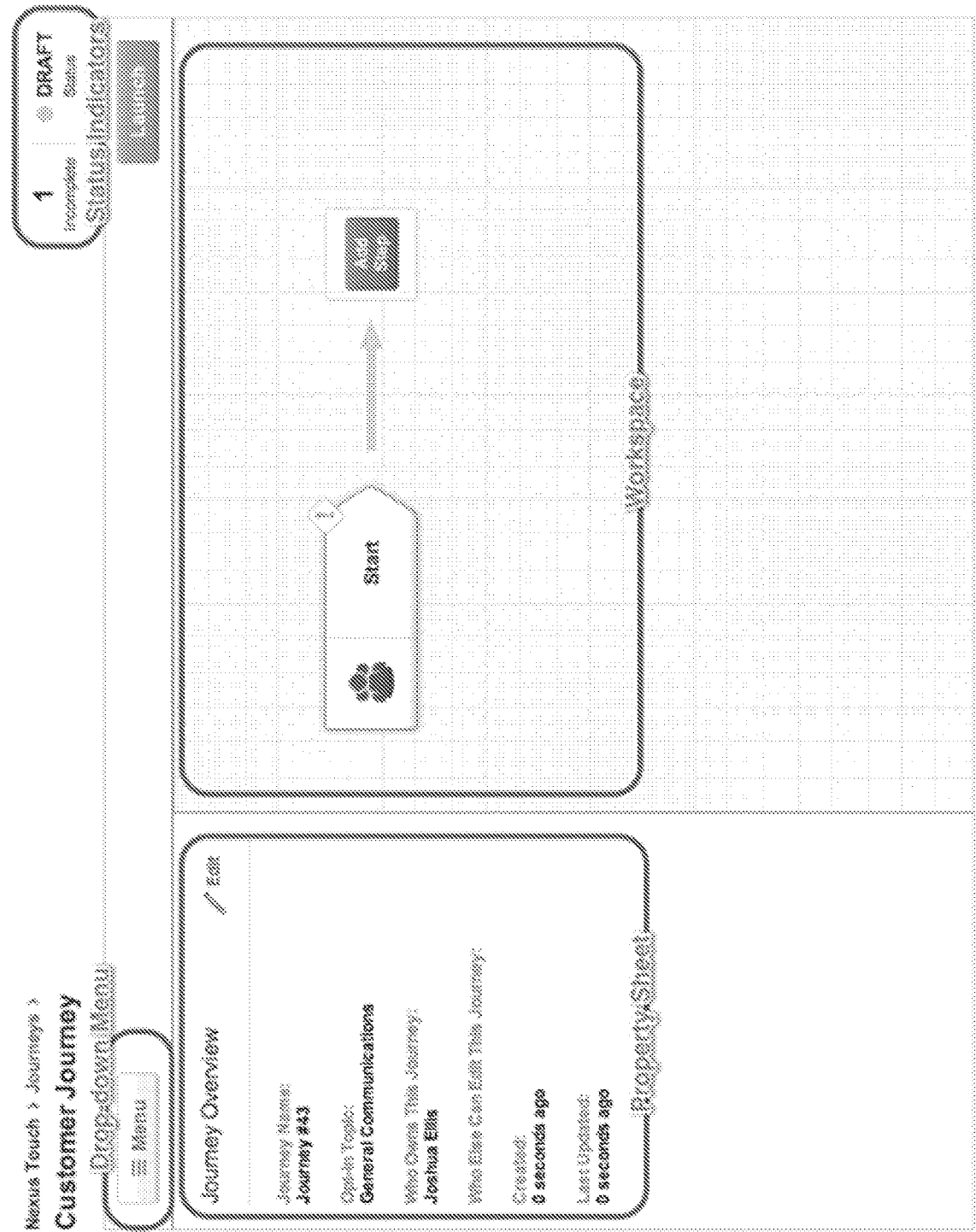
FIG. 3 shows an example navigational interface for a user to program a Journey according to some implementations.

FIG. 3 shows an example menu interface for a user to program a Journey according to some implementations. The Journeys editing interface includes a Property Sheet on the left-hand side, and a Workspace on the right.

The Property Sheet is for the display and editing of the currently selected Step or Path. If no Step or Path is selected, the Property Sheet displays the Journey overview. The Property Sheet is a button for a drop-down menu, which includes a link to the Journeys user guide, and options to duplicate the Journey, delete the Journey, go to the Overview property sheet (i.e. the general Journey properties), and view a list of incomplete items (for example steps expecting completion before launching the Journey into active mode).

As illustrated, the top-right corner of the Journeys workspace displays status information, such as Draft versus Active status, and the number of Steps with incomplete or invalid information.

As a Journey is being edited, each step and path are validated. This validation checks for missing and invalid information, and for problems with the workflow.

Figure 4:
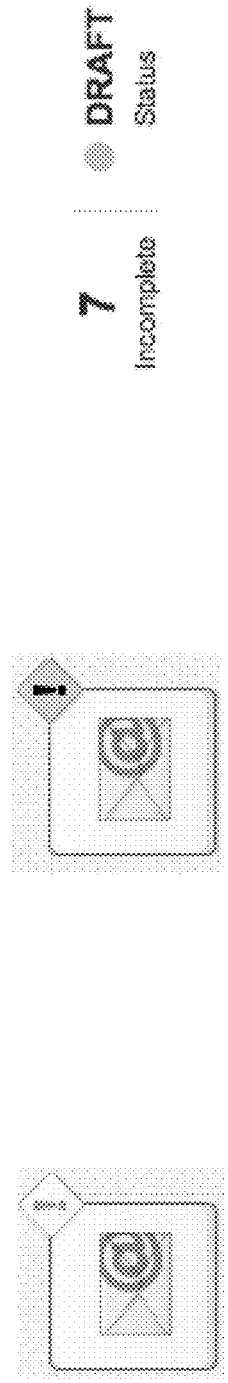
FIG. 4A shows an example icon indicating an incomplete step according to some implementations.
FIG. 4B shows an example icon indicating an invalid step according to some implementations.
FIG. 4C shows an example Journey being drafted with a summary status report according to some implementations.

FIG. 4A shows an example icon indicating an incomplete step according to some implementations. Incomplete steps are flagged with an exclamation icon. This indicates that information is missing. It is quite common to have incomplete steps while you build out a Journey. The Journeys interface enables marketers to build out the logical workflow first, and add the details later. To supply the missing information, click on the Step, and update it in the Property Sheet.

FIG. 4B shows an example icon indicating an invalid step according to some implementations. Invalid steps are flagged with a yellow and black exclamation icon. This indicates that something about the step is configured incorrectly. To see the error and correct it, click on the Step, and update it in the Property Sheet.

FIG. 4C shows an example Journey being drafted with a summary status report according to some implementations. Some steps may not allow the launch of a Journey until all or substantially all required information is supplied and correct. To see a list of missing and invalid information, a user may select Incomplete Tasks from the drop-down menu above the property sheet, or click on number of incomplete steps in the status area above the Journeys Workspace.

A user, for example, a marketing professional, can create a new Journey from the Campaigns menu, under Create New→New Journey, or by clicking the [New Journey] button from the All Journeys listing page. When a new Journey is first created, basic information, including the Journey name, the Opt-in Topic for emails or other multi-channel marketing within the Journey, Members, and Owner, may be provided from a user interface.

Figure 5:
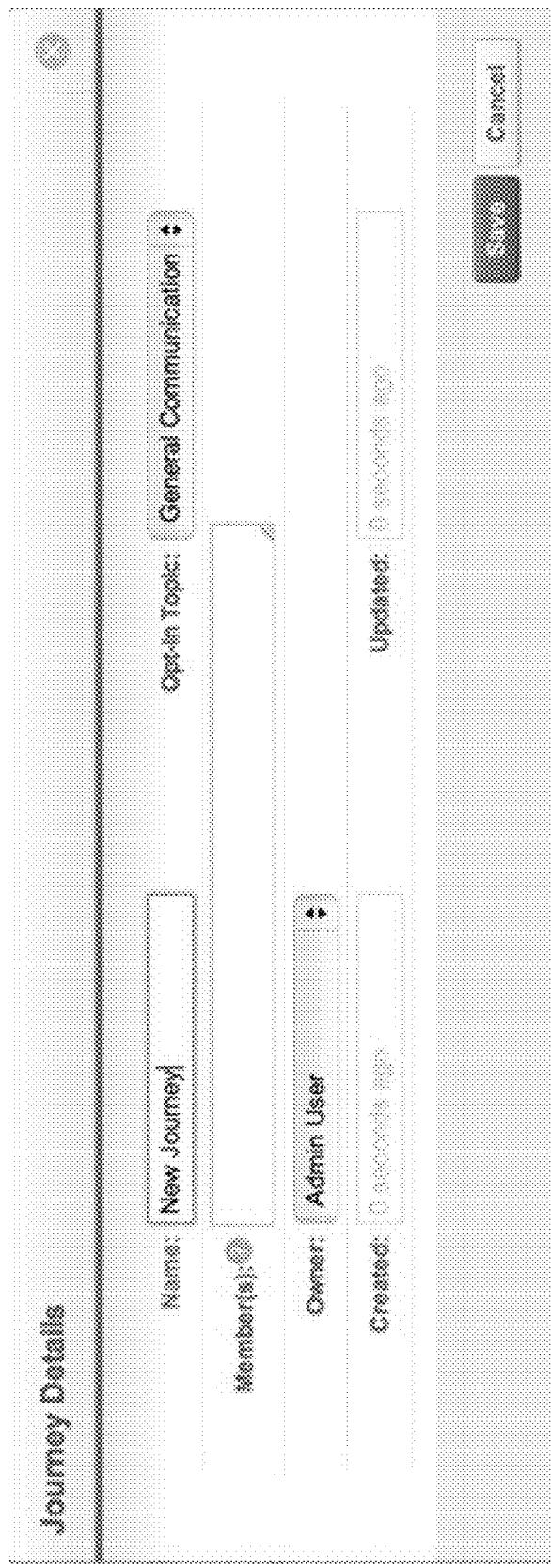
FIG. 5 shows an example interface for creating a Journey according to some implementations.

FIG. 5 shows an example interface for creating a Journey according to some implementations. As illustrated, the Opt-in Topic may be based on the system list of Opt-In options used for campaigns and other forms of communication, and may allow a Contact to opt-out of communication from this Journey, should a target customer decide to unsubscribe from the system-generated e-mail, SMS, Direct Mail, or other channel for electronic communication.

The ability to edit, start, pause, and stop a Journey may be restricted to the Journey owner and Journey members. The Owner defaults to the user that creates the Journey, for example, a marketing professional. To give other users the ability to modify the Journey, the identities of these other uses may be entered into the Member(s) field. The Member(s) field will do name matching based on username; to add a user, type the first few letters of their first or last name, and pick them from the pop-up list of matching users. Once the Journey details are set, the user may click the [Save] button to save the draft Journey. The user may update these values later by selecting Overview from the Journey Menu, and clicking [Edit] in the left-hand property pane.

When a user creates a new Journey, the Journey will have only step, the Start Step. The Start Step may define the Journey Targets and Journey Triggers. Targets specify which Contacts become Targets of the Journey, and how many times they can go through the Journey. Triggers specify what system events cause the selected Contacts to move off the Start step and begin travelling through the Journey.

Figure 6A:
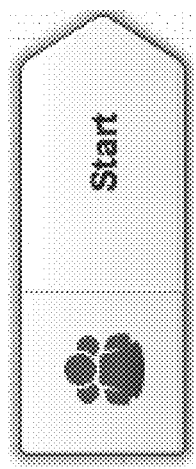
FIG. 6A shows an example start step for a Journey according to some implementations.

FIG. 6A shows an example start step for a Journey according to some implementations. To define the Targets and Triggers, click on the Start step in the Journey workspace. The Start step configuration will display in the left-hand property sheet. Remember: Targets control who goes on the Journey; Triggers control when they go on the Journey.

Targets define which system objects used for the Journey. In some implementations, only Contacts can be Targets of a Journey, and the only option available in From This Journey would be Target Contacts. In some implementations, the drop-down for Send Targets Through This Journey specifies how often a Contact may become a Target of the Journey. The default is Once per Contact, which means no matter how many times the trigger criteria are met, if the Contact has already been added as a Target, the contact will not be added again. Depending on the Trigger configuration, different options may be available for Send Targets Through This Journey. Here are a few examples:

Once per Contact Created
Once per Activity Updated
Once per Survey Completion Created
Once per Contact Response Updated The Journey filter criteria (specified next in the Targets section) may match existing Contacts, or Contacts yet to be created in the system. In some implementations, by default, any existing or new Contacts that match the target filters become Targets of the Journey. To only allow new Contacts, a user may change the drop-down to One Time Per Contact Created.

The Filter by the Following Criteria section may specify which Contacts are valid Targets of this Journey. In some implementations, a Contact already meeting the Filter Criteria may not automatically become a Target of the Journey as the valid Targets will have met the conditions before the corresponding contact was created or updated—so the valid Targets will never meet the trigger conditions. These existing Travelers must be added to the Journey separately via "Segment Injection".

The Target Filter may generally be defined as broadly as possible, to capture all possible Contacts who are valid Targets of the Journey. In some implementations, the broad definition may be obtained by the No Limits; Send All Targets Through option. Generally speaking, though, a set of filtering criteria is usually defined.

If a Segment in the system already defines appropriate criteria, the set of criteria may be imported into the Target Filter by clicking the [Import] button. A user may always edit these imported Target Filter criteria later. Thus, a user may pick a Segment close to the desired Target Filter, and then adjust the Target Filter criteria as necessary. A user may click [Import] to pop up a list of system Segments, and then Pick one to load the criteria defined therein.

To define new criteria or adjust the criteria specified for the Target Filter, a user, in some implementations, may click the [Add Criteria] button. This will load a criteria-editing screen very similar to the one used for defining Segments. The full set of Segment criteria may be available, allowing one to create segments based on any attributes of standard and custom entities in the system, and including grouping logic to combine into "AND" or "OR" groups.

Figure 6B:
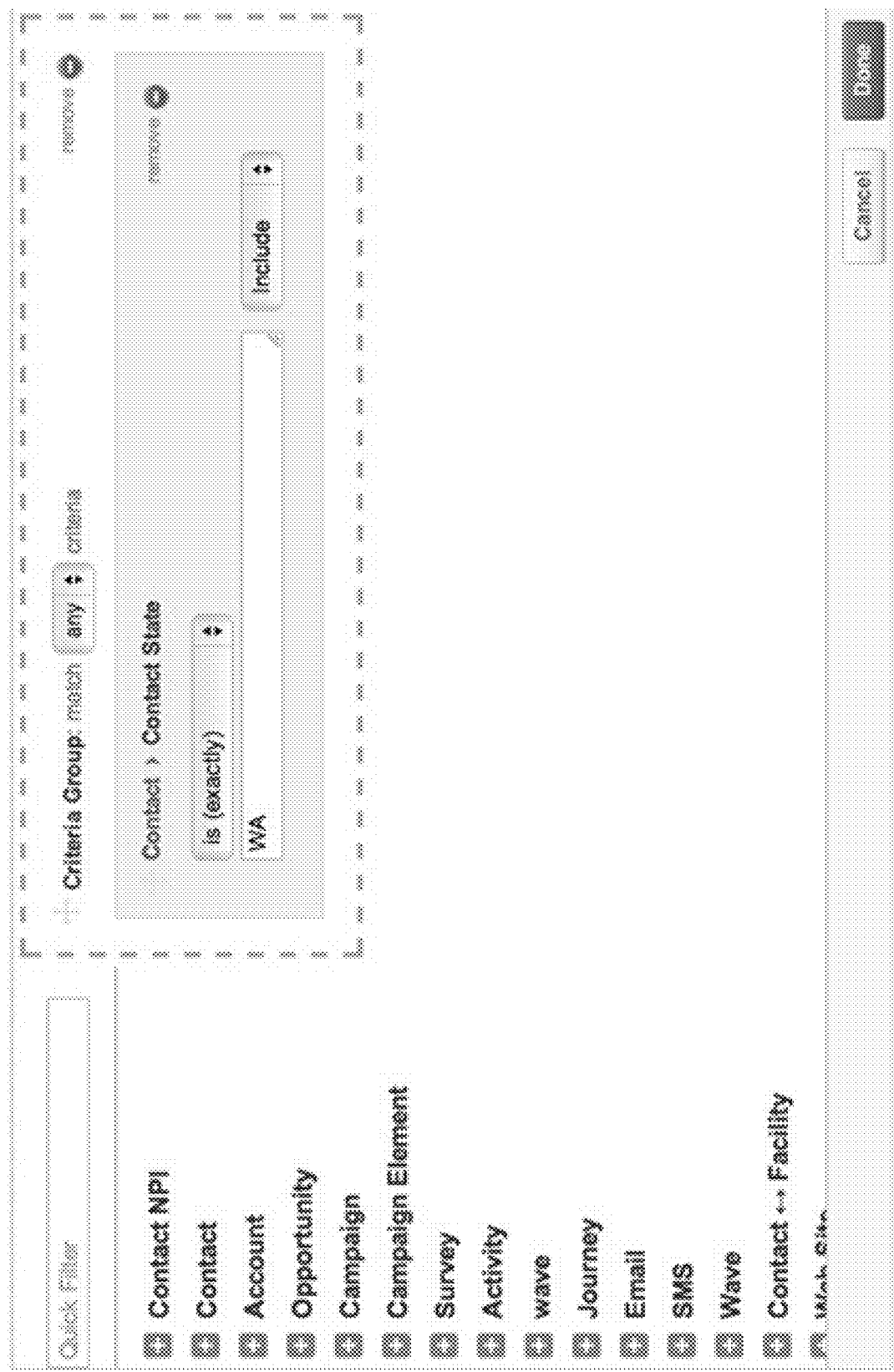
FIG. 6B shows an example interface for configuring target filters for a Journey according to some implementations.

FIG. 6B shows an example interface for configuring target filters for a Journey. A user may define the filter that describes which Contacts are valid Targets of the Journey, and then hit [Done] to save your selection. The user may click [Edit] to change the filter. The user may also click the [Add Criteria] button again to edit the filter.

Triggers may identify the system event(s) that cause Contacts matching the filter criteria to become Targets of the Journey. System events available for this release of Journeys may include:

Contact Creation or Update
Activities
Survey Completions
Contact Responses

In some implementations, the Trigger may be further refined by:

Created
Updated
Created or Updated

Similar to the Targets field, Triggers can also have filter criteria. For a basic Contact trigger, a user may select No Limits; Send All Targets Through, because a user marketing professional is expected to limit which Contacts are eligible for the Journey in the Targets area. If the Contact Target filter is set appropriately, there is no need to repeat the filter in the Trigger area.

Setting a filter for Activity Triggers may allow a user marketing professional to specify which Activity or Activities should start a Contact through the Journey. Available filters may include Activity Name, Activity Type, Activity Subtype, Activity Notes, Activity Status, Activity Due Date, and other Activity-related properties. When the Activity Trigger filter criteria are satisfied, the Contact associated with that Activity event will start the Journey.

Setting a filter for Survey Triggers allows a user marketing professional to specify which survey to be used for a target consumer recipient.

Setting a filter for Contact Responses Triggers may allow a user marketing professional to specify which type of response will cause the associated contact to start the Journey. Responses can be filtered by Campaign, Survey, Email, SMS (if available), and Wave.

Figure 7B:
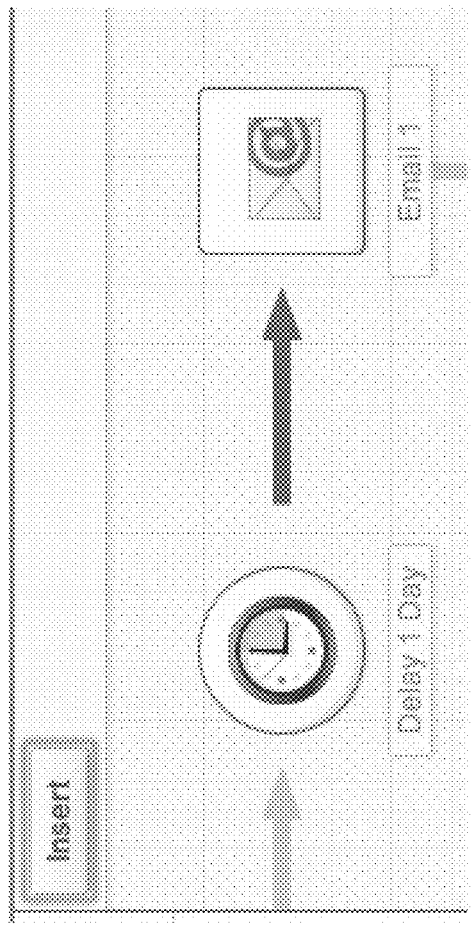
FIG. 7B shows an example interface for inserting a step to a Journey according to some implementations.
Figure 7A:
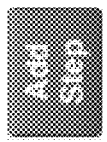
FIG. 7A shows an example add step icon for programming a Journey according to some implementations.

FIG. 7A shows an example add step icon for programming a Journey according to some implementations. When a user marketing professional clicks the add step icon, a pop-up menu will allow the user marketing professional to choose which type of step to add. Example steps are explained further herein.

FIG. 7B shows an example interface for inserting a step to a Journey according to some implementations. To insert a step between two existing steps (for example, a delay step and an email step, a user marketing professional may click on the path that connects the two existing steps. When a path is selected, an [Insert] button may appear in the upper-left corner of the Journeys workspace, as illustrated.

FIG. 8 shows an example email step for a Journey according to some implementations. The e-mail step may be used to send an e-mail communication to the current Target, to the Target's sales rep (if available), or to a specific set of e-mail addresses. The e-mail itself can be edited the same way as an email would be composed or edited, plus the use of any contact attributes to personalize the email. For example, if a contact named "Ada Lovelace" were the Traveler on the Journey, and her contact record passed an email step that was, in the content of the email, addresses to "Dear $firstname," the email would be personalized to read, "Dear Ada,". In some implementations, to edit the E-Mail Step properties, a user marketing professional may click on the e-mail step in the Journey workspace, and the E-Mail Step information will appear in the left-hand property panel. A user marketing professional may then configure the name of the step (shown on the node label in the Journey workspace) in the unlabeled text box at the top of the property sheet. The [Edit Email] button may launch the e-mail editor. The Send Email To: drop-down is where a user marketing professional can specify the recipient of the e-mail—the contact, the sales rep, or specified list of e-mail addresses.

In some implementations providing an Email Addresses option, a text box may be the interface for a user marketing professional to specify the recipient e-mail addresses. To send to multiple recipients, the user marketing professional may add a comma-separated list of email addresses.

Figure 9:
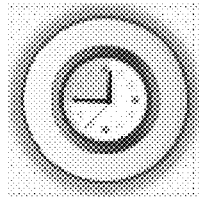
FIG. 9 shows an example delay step for a Journey according to some implementations.

FIG. 9 shows an example delay step for a Journey according to some implementations. The Delay Step may insert a pause, or a Delay, into the Journey. This is used to space out steps of a Journey. A Journey can be delayed by either a specified wait time, or until a specific date. In some implementations, the minimum amount of wait time for a Delay step may be 24 hours. Some implementations of Journeys have built-in selections for 24 hours, 48 hours, one week, two weeks, 30 days, and 60 days. A user marketing professional can also manually specify a fixed number of days to wait, for example, with a minimum of one day. A Delay Step can also be configured to wait until a specific date in the future instead of a certain number of days. Some configurations may allow Targets to reach a "specific date" via a Delay Step after the specific date. In this scenario, the Target moves through the Delay Step to the next step with no delay.

Figure 10B:
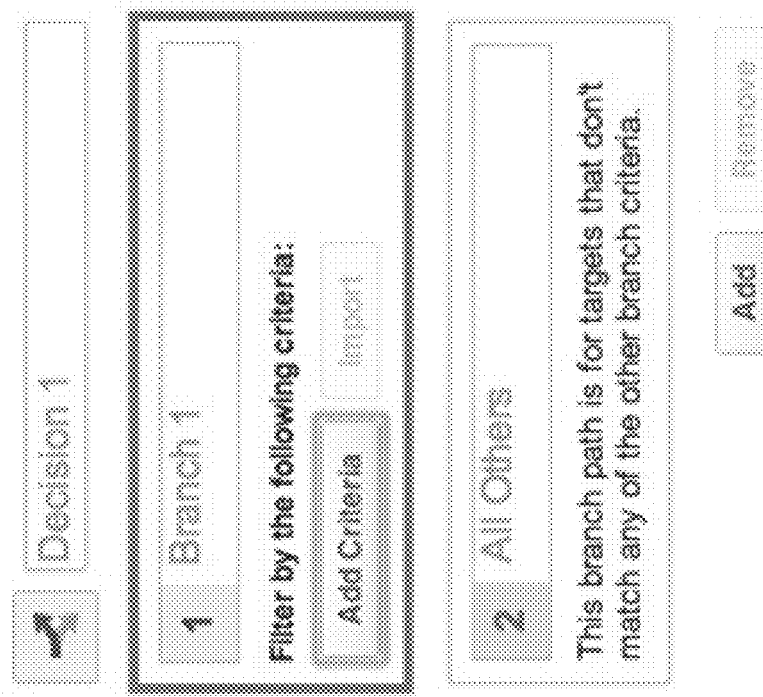
FIG. 10B shows an example branching on a survey response according to some implementations.
Figure 10A:
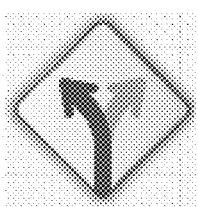
FIG. 10A shows an example decision branch for a Journey according to some implementations.

FIG. 10A shows an example decision branch for a Journey according to some implementations. The Decision Branch Step is the logical flow control that guides a Target through a Journey. The Decision Branch Step may function as a workhorse to send a Target down one of multiple paths depending on Target properties or Activities. In some configurations, a single Decision Branch Step can split into a maximum of, for example, six paths, up to five based on a full set of Segment-like filter criteria. The final path may include an "All Others" path, to catch any remaining Targets who did not move down one of the paths specified by the individual branch step filters.

In some implementations, a Target may only exit a Decision Branch step along one path. A Decision Branch can have up to five filter paths, plus the one "All Others" path. The Decision Branch Step may be executed to look for the first appropriate filter match, and then the Target may be sent down that branch. If a match is not found, the next branch is evaluated, and the process is repeated until the "All Others" branch is reached, in which case the Target is forwarded down the "All Others" path.

An example of Branch processing survey responses is provided herein. As illustrated in FIG. 10B, to branch on a survey response, a user marketing professional may add a Decision Branch Step to the Journey. In one configuration, in the Decision Branch property sheet, the user marketing professional may click the [Add Criteria] button for Branch 1.

Figure 10C:
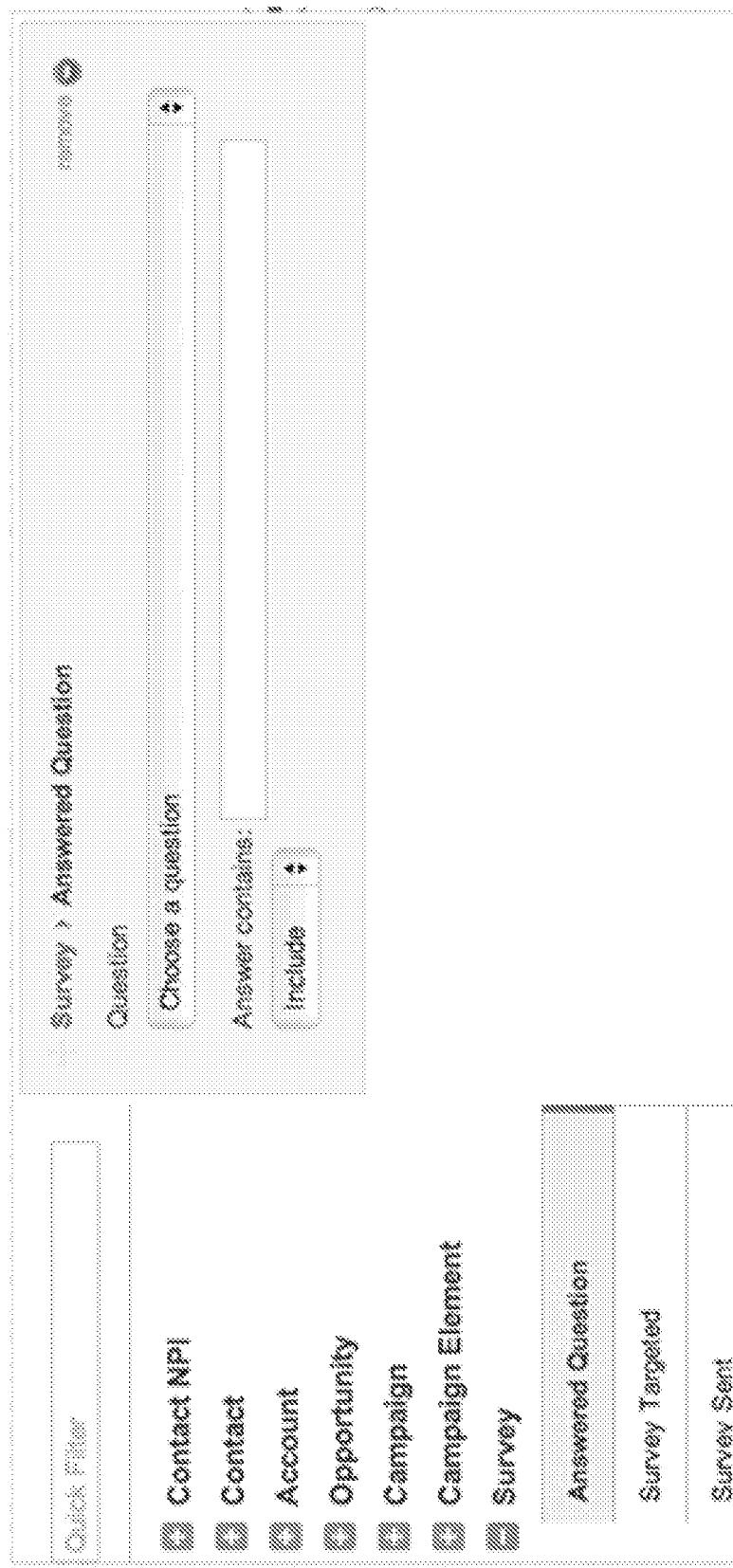
FIG. 10C shows an example filter builder for processing responses to the survey of a Journey according to some implementations.

The clicking will pull up a criteria filter builder, as illustrated in FIG. 10C. The criteria filter builder interface is similar to the criteria filter builder for Segments, or for setting the Target and Trigger criteria for the Start Step. The filter options may include the option of Survey—Answered Question. As illustrated in FIG. 10C, a user marketing professional may click on this option to specify the survey question for a target customer, and the selection of answers available. Specifically, the user marketing professional may click the [Choose a Question] drop-down box to get a complete list of surveys and survey questions in an example implementation. The user marketing professional may also add more answer you options to branch on in the Answer Contains field.

The Journey may be launched as a server-administered program. The program may be executed by a server in the back-ground, while the server runs other programs in the foreground. The program may be executed by the server with a timer mechanism, for example, the program may be dormant until the specific delay has reached, with the delay implemented by the timer mechanism. The time mechanism may include a software interrupt implementation. The timer mechanism may also include a polling implementation.

After the Journey is launched, a Target customer may reach a Decision Branch node. In some implementations, the back-end system may check if this Target customer has completed the specific survey, answered the specified question. The back-end system may also check if the survey response matched the Answer Contains field. If there is a match, the Target customer may be sent down the matching branch. In the case illustrated by FIG. 10B, the matching branch is the first branch and if there is a match, the Target customer may be sent down the first branch. On the other hand, if there is no match, the Target customer may be sent down the next or the All Other branch.

Figure 10D:
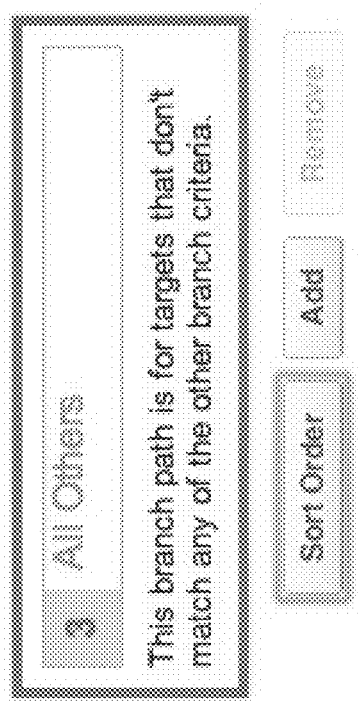
FIG. 10D shows an example interface for a catch-call filter for processing responses to a survey of a Journey according to some implementations.

In some implementation, to add more than one branch or evaluation into a Decision Branch step, a user marketing professional may press the [Add] button below the "All Others" branch, as illustrated in FIG. 10D. By such a click, a new decision branch with a criteria filter may be inserted before "All Others." In some implementations, a cap may exist as to the number of filtered branches that can be added to a single Decision Branch step. In the default configuration, the cap may be set at five filtered branches.

Some implementations may allow a user to re-order the filtered branches in a Decision Branch step. As discussed herein, the criteria for each branch may be evaluated in consecutive order, and the Target customer may be sent down the branch of the first match. If there is more than one filtered branch in the Decision Branch Step, the order in which the more than one filtered branches are presented to a Target customer may be configured by the user marketing professional through a [Sort Order] button at the bottom of the property sheet.

Figure 10E:
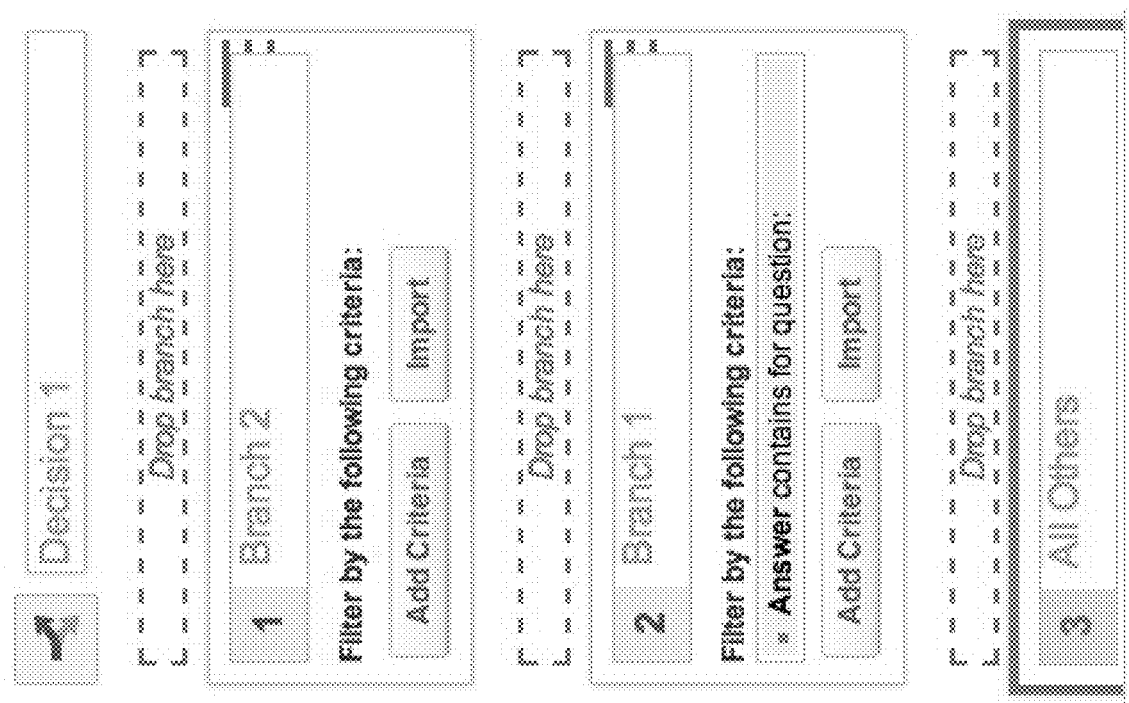
FIG. 10E shows a holistic view of an example filter for processing responses to the survey of a Journey according to some implementations.

To re-arrange the Decision Branch evaluation order, a user marketing professional may click the [Sort Order] button. As illustrated by FIG. 10E, such a click may add drop zones into the Decision Branch property sheet, allowing the user marketing professional to drag and drop the individual decision branches into the desired order, except the "All Others" path, which may remain the final option.

Figure 11:
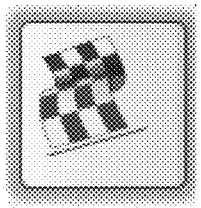
FIG. 11 shows an example end step of a Journey according to some implementations.

FIG. 11 shows an example end step of a Journey according to some implementations. The End Step is a terminal step in a Journey. All Journeys are expected to have at least one End Step, and some Journeys may have more than one end step. Once a Target customer reaches an End Step, the target customer has completed the Journey. The completion may be reached for a variety of reasons, for example, because the prescribed steps have been traversed, because time-out values have been reached, etc. In some implementations, when a Journey is launched, remaining add steps may turn into end steps automatically.

Figure 12A:
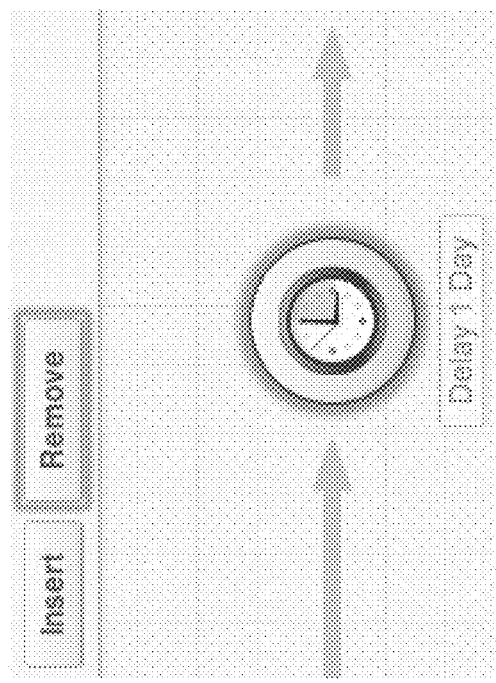
FIG. 12A shows an example interface for deleting a step from a Journey according to some implementations.

FIG. 12A shows an example interface for deleting a step from a Journey according to some implementations. In some implementations, to remove a step from a Journey, a user marketing professional may click on Step's icon in the Journey's workspace, and then click the [Remove] button that appears in the upper-left corner of the Journey's workspace.

Figure 12B:
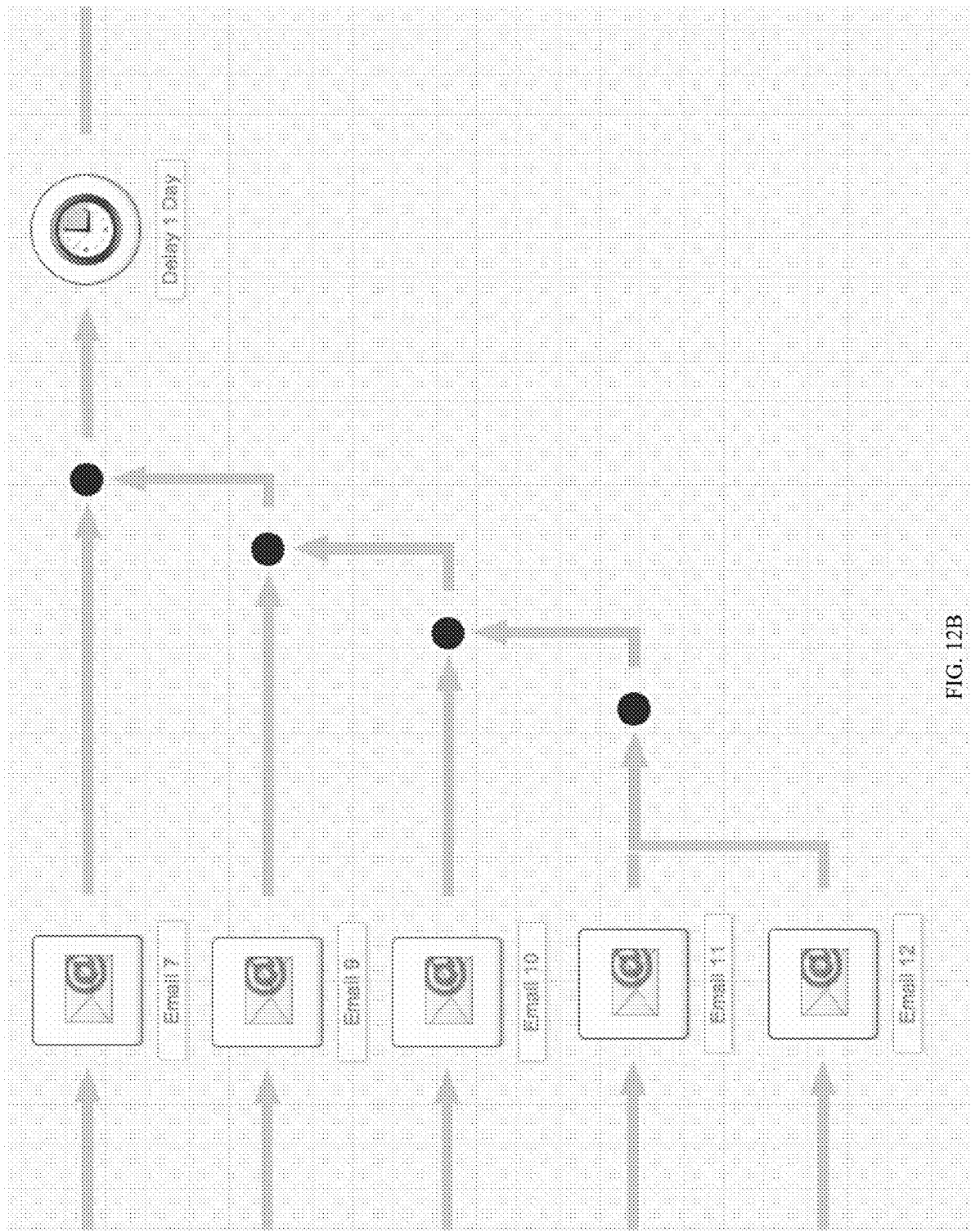
FIG. 12B shows an example Journey with merged paths according to some implementations.

FIG. 12B shows an example Journey with merged paths according to some implementations. In some implementations of Journey, multiple paths may be merged into one path. A variety of reasons may justify a paths merge, including collapsing multiple paths into a single step, or creating a loop that would enable a Target customer to pass through a series of steps multiple times. In some implementations, to merge a first path into a second path, a user marketing professional may click on the [Add Step] box at the end of the first path. One of the options in the pop-up option will be "Connect To . . . " at which point the user marketing professional can choose the second path merge into, as illustrated in FIG. 12B.

Figure 12C:
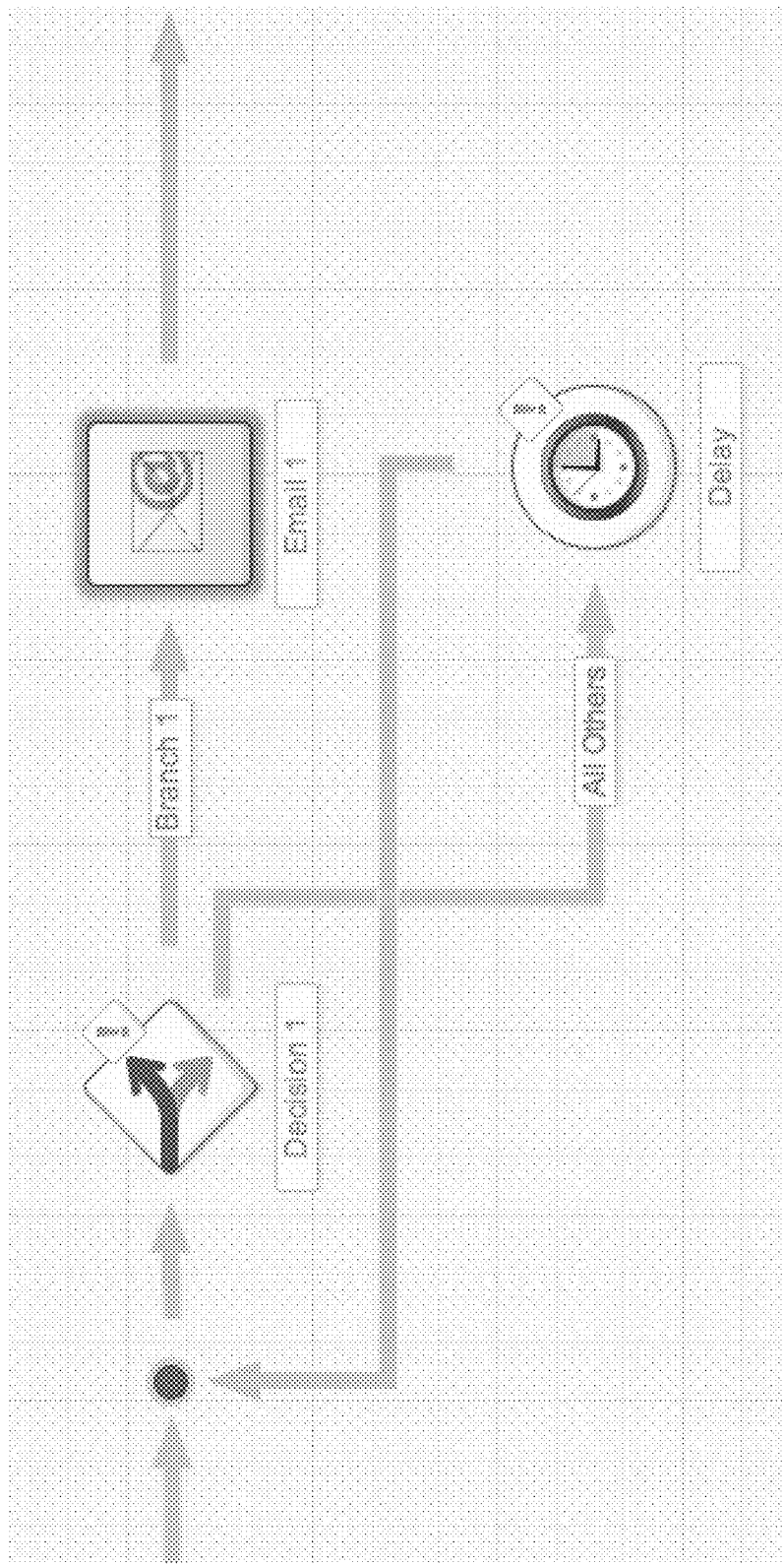
FIG. 12C shows an example Journey with a loop configured according to some implementations.

In some implementations, a Journey may include a wait for specific criteria to be met. This wait may be accomplished by a combination of a Decision Branch Step, a Delay Step, and a Merged path. FIG. 12C shows an example Journey with a loop configured according to some implementations. For example, a user marketing professional may create a Decision Branch Step where Branch 1 only allows Targets through if the Target customers have accomplished some action, or some desired property for these Target customers is set. A user marketing professional may continue the Journey as normal along branch one. On the All Others branch, the user marketing professional may create a Delay Step of the appropriate length. In some cases, the Delay step may include a 24-hour delay. From the Delay Step, the user marketing professional may select the "Connect To . . . " option from the Add Step pop-up, and then click on the path right before the Decision Branch step.

When this prescribed Journey runs, Target customers who do not meet the Branch 1 criteria move on to the Delay step. After a 24-hour delay, these Target customers may connect back to the path right before the Decision Branch node. The Target customers may then proceed to the Decision Branch for re-evaluation. If the filter criteria are met, then the Target may proceed down Branch 1. If the filter criteria are not met, the loop is repeated for another 24-hours delay, and back to the Decision Branch step.

Figure 12D:
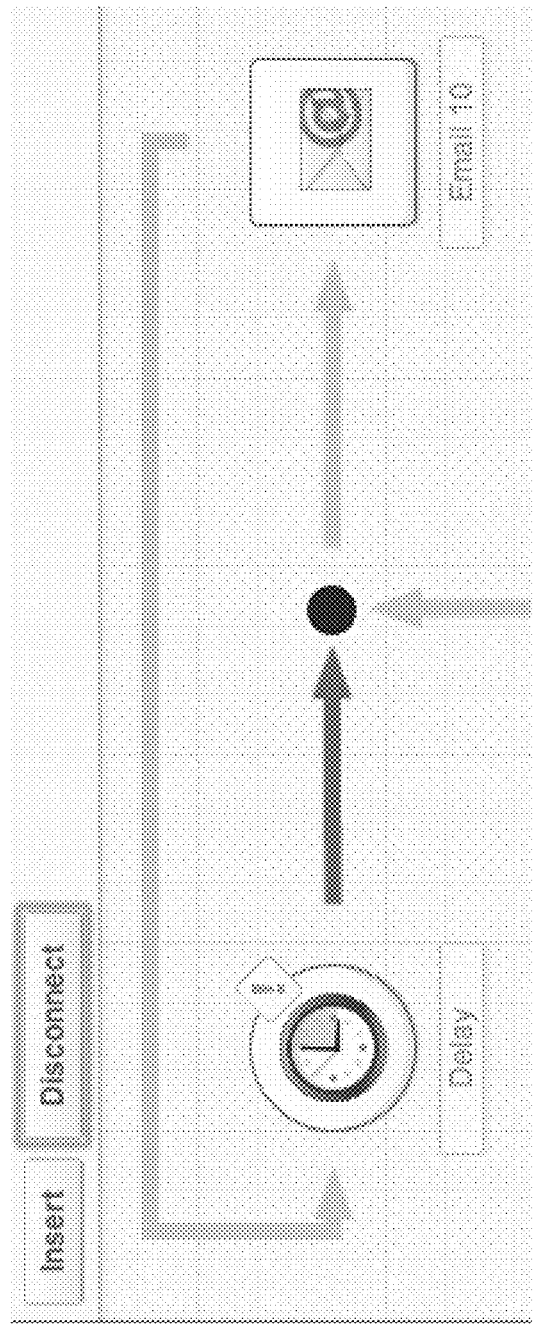
FIG. 12D shows an example of disconnecting merged paths of a Journey according to some implementations.

FIG. 12D shows an example of disconnecting merged paths of a Journey according to some implementations. In some implementations, to remove a merged path, a user marketing professional may select one of the merging paths to be disconnected. In the upper-left of the workspace, two buttons may be present, one for Insert and one for Disconnect. A user marketing professional may click the Disconnect button to detach the path from a merged pair.

In some implementations, to copy a Journey, a user marketing professional may select Duplicate This Journey from the drop-down menu. The user marketing professional may then be prompted for the name of new Journey in order to create a new Journey in draft status with all the same steps, paths, and filters as the Journey being copied.

Some implementations may require a Journey in Draft or Stopped status before a user marketing professional can delete it. To delete an active Journey, a user marketing profession may first stop the Journey by selecting Stop This Journey (Permanent) from the drop-down menu above the property sheet. Thereafter, to delete the Journey, the user marketing profession may select Delete This Journey from the drop-down menu. The user marketing professional may be prompted for confirmation before the chosen Journey can be deleted.

Figure 13A:
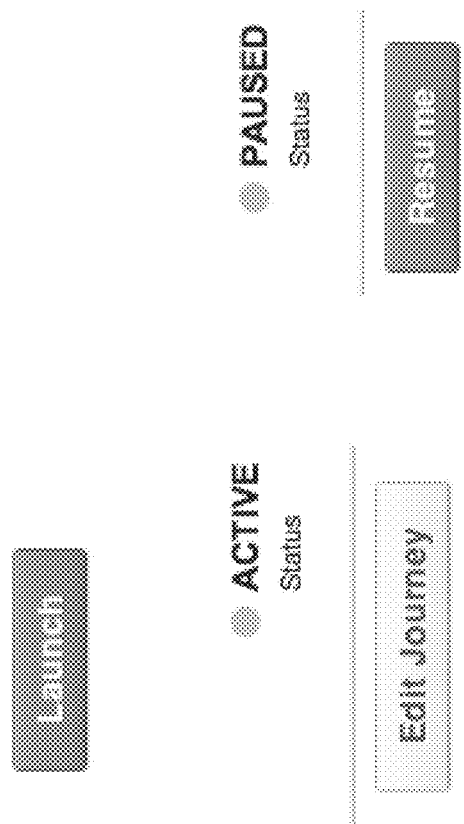
FIG. 13A shows examples of status of a Journey according to some implementations.

FIG. 13A shows examples of status of a Journey according to some implementations. As illustrated, in some implementations, to launch a Journey, a user marketing professional may click the [Launch] button above the Journey workspace. Once a Journey is launched, the prescribed steps of the Journey will be executed autonomously.

Figure 13B:
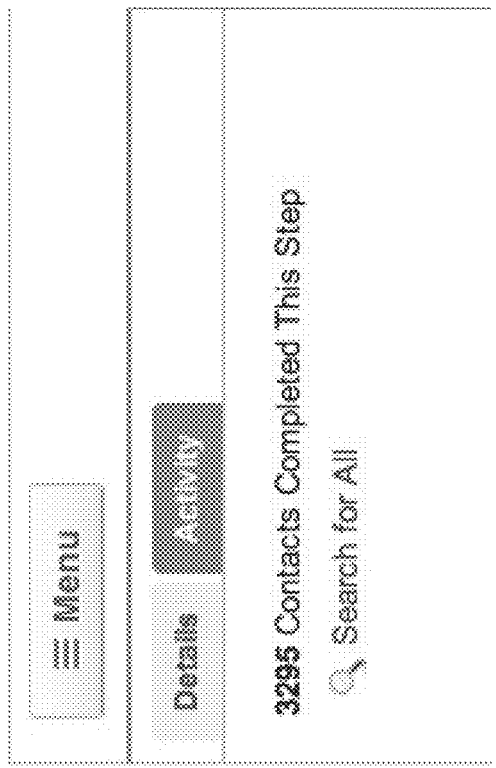
FIG. 13B shows an example interface for tracking the number of targets who has started a Journey according to some implementations.

Notably, the Journey will not launch if there are any validation or completion errors (i.e., any missing or invalid information on steps). Once a Journey is launched, in some implementations, the Journey will go from Draft to Active status, and the [Launch] button will change to an [Edit Journey] button, as illustrated in FIG. 13B.

In some implementations, while a Journey is active, modification of the constituent steps may not be feasible. To make changes, the Journey may need to be paused. To modify a Journey that is already active, a user marketing professional may click on the [Edit Journey] button to be greeted by a confirmation window first. After confirming the intention of pause, the user marketing professional may then click pause the Journey and put the Journey back an editable state, as illustrated by FIG. 13A.

While editing a paused Journey, a user marketing professional can change properties on a particular step other than the Start step, remove existing steps, and insert new steps. While a Journey is paused, the [Launch] button may be replaced with a [Resume] button, as illustrated by FIG. 13A.

In some implementations, resuming a paused Journey does not cause the Travelers on the Journey to start over from the Start step. Target customers on the Journey may remain at the step where they were when the Journey was paused. On the other hand, Target customers that would have entered the Journey when the Journey was paused may be unable to enter the Journey until the Journey is launched again.

Furthermore, some implementations, Journeys provide tracking of Journey progress from within the Journeys interface. When a Journey is in draft mode or paused, a user marketing professional may click on Steps to bring up a Details panel property sheet. When a Journey is running or completed, the user marketing professional may click on Steps to display an Activity panel in the property sheet also. For example, to see the number of Targets that started a particular Journey, a user marketing professional may click on the Start Step. The Activity panel may display a count, with a link to show all Targets processed, as illustrated in FIG. 13B.

In some implementations, to see all the Travelers who have arrived at a step, a user marketing professional presses the Search for All link, the Find Customers screen, populated with the list of Contacts (as the Traveler type), may pop up. An Export to Excel option may be provided in Find Customers.

Figure 13C:
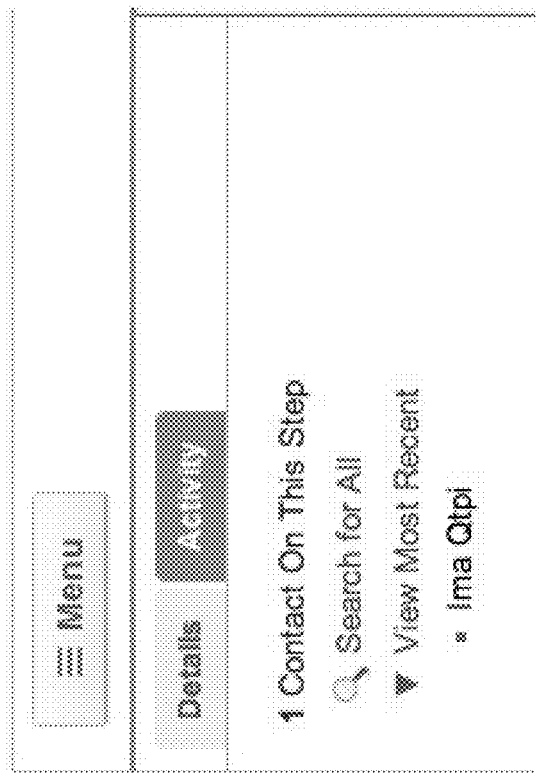
FIG. 13C shows an example interface for configuring other steps for a Journey according to some implementations.

For Steps other than Start, the Activity panel will include options to show the most-recent Target customers process, or to see the complete list of Target customers. In some implementations, a user marketing professional may click View Most Recent to display the several most-recent Target customers processed by the particular step. This is particularly useful for seed testing a Journey with a small group of test subjects as Travelers. FIG. 13C shows the name of one Target customer recently processed by this particular step.

Figure 13D:
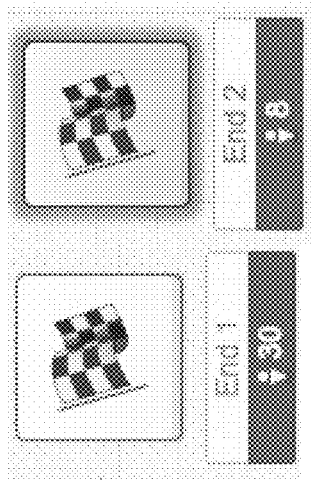
FIG. 13D shows an example interface for reporting the number of targets completing a Journey according to some implementations.

As disclosed herein, a given Journey may have multiple end-points. The number of Targets that finish the Journey on each End Step may be shown below the End Step label, as illustrated in FIG. 13D. From the Activity panel you can use Search for All to see the list of individual Contacts for the each of the Target customers.

Some implementations disclosed herein allows marketing professionals to develop a single view of their overall strategy that not only conveys the flow of a relationship marketing campaign, but also executes the marketing campaign step by step in an autonomous manner, thereby bringing their marketing vision to life. The implementations disclosed herein also allow flexible data manipulation on the backend, thereby allowing for a variety of changes to the database to be systematically "programmed" through a drag and drop interface that may not require programming knowledge. Data manipulation may be beneficial because it enables scenarios like "lead scoring" where a prospect can have a field updated to increase their value/likelihood to buy or interact in the future based on previous behavior. For example, if someone clicked a link in an email, the person may be given some points, for example 10 points. If the person additionally viewed a promotional web page, the person may be given another 10 points, and if the person further registered for an event, the person may be given yet another 50 points, for a total of 70 points. Branch logic based on how many points people have may then be implemented to direct a tailored marketing strategy into different marketing programs based on the scores of the person.

With the increase of types of Travelers, triggers, and steps as options to add to the Journey, the flexibility and power of Journeys as disclosed herein become quickly apparent.

Moreover, the user interface of some implementations includes many useful features. The front-end design interface makes it easier for marketers to program marketing campaigns than other tools on the market. The backend for the system is designed in a way that enables us to process millions of Travelers an hour making it possible to scale up to very large patient marketing programs. Some implementations may provide support for a wide range of data manipulation operations including updates, deletes, and a full set of math/calculation operations. Some implementations may provide management logic and interfaces to enable marketers to quickly and easily see and manipulate Travelers that are moving through a running program.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

The invention claimed is:

1. A method to develop, convey, and execute on a server connected to a network, a relationship marketing campaign directed to target recipients, the method comprising steps of:
receiving, by the server via the network, information regarding one or more target recipients from respective target recipients using computing devices connected to the network and data that prescribes a flow of the campaign from a respective marketing professional using additional computing devices connected to the network;

defining and performing, by the server, steps of a flow program to automatically engage the one or more target recipients, wherein the data prescribes at least (a) target criteria for classifying the one or more target recipients, (b) trigger criteria to define when the one or more target recipients receive information, and (c) a plurality of branches of the flow program, wherein each branch is defined to, and when performed delivers, different content;

monitoring, by the server, the steps of the flow program to ascertain when the computing devices of the one or more target recipients are engaged;

selecting, by the server, first target recipients from the one or more target recipients who meet the target criteria;

awarding, by the server, a number of points to the first target recipients when the trigger criteria are satisfied, wherein the trigger criteria are satisfied when the first target recipients have completed one or more on-line activities using the respective computing devices, and the number of awarded points is based on the one or more on-line activities completed as indicated by the respective computing devices;

directing, by the server, the steps of the flow program for (a) the first target recipients who have a first number of awarded points down a first branch of the plurality of branches, and (b) the first target recipients who have a second number of awarded points down a second branch of the plurality of branches, wherein the first branch delivers different content than the second branch; and providing, by the server, to the additional computing devices of the marketing professional explanations and visual aid indications regarding the first target recipients that have been directed down each of the plurality of branches.

2. The method of claim 1, further comprising a step of: decoding the data to introduce a loop to the prescribed flow program.

3. The method of claim 1, further comprising: decoding the data to introduce a decision branch to the prescribed flow program.

4. The method of claim 1, further comprising a step of: decoding the data to introduce a parallel branch to the prescribed flow program.

5. The method of claim 1, further comprising a step of: decoding the data to add one or more steps to the prescribed flow program.

6. The method of claim 1, further comprising a step of: decoding the data to remove one or more steps from the prescribed flow program.

7. A system to develop, convey, and execute on a server connected to a network, a relationship marketing campaign directed to target recipients, the system comprising:

the server including a processor configured to:

receive, via the network, information regarding one or more target recipients from respective target recipients using computing devices connected to the network and data that prescribes a flow of the campaign from a respective marketing professional using additional computing devices connected to the network;

define and perform steps of a flow program to automatically engage the one or more target recipients, wherein the data prescribes at least (a) target criteria for classifying the one or more target recipients, (b) trigger criteria to define when the one or more target recipients receive information, and (c) a plurality of branches of the flow program, each branch is defined to, and when performed delivers, different content;

monitor the steps of the flow program to ascertain when the computing devices of the one or more target recipients are engaged;

select first target recipients from the one or more target recipients who meet the target criteria;

award a number of points to the first target recipients when the trigger criteria are satisfied, wherein the trigger criteria are satisfied when the first target recipients have completed one or more on-line activities using the respective computing devices, and the number of awarded points is based on the one or more on-line activities completed as indicated by the respective computing devices;

direct the steps of the flow program for (a) the first target recipients who have a first number of awarded points down a first branch of the plurality of branches, and (b) the first target recipients who have a second number of awarded points down a second branch of the plurality of branches, wherein the first branch delivers different content than the second branch; and provide to the additional computing devices of the marketing professional explanations and visual aid indications regarding the first target recipients that have been directed down each of the plurality of branches.

8. The system of claim 7, wherein the processor is further configured to: decode the data to introduce a loop to the prescribed flow program.

9. The system of claim 7, wherein the processor is further configured to: decode the data to introduce a decision branch to the prescribed flow program.

10. The system of claim 7, wherein the processor is further configured to: decode the data to introduce a parallel branch to the prescribed flow program.

11. The system of claim 7, wherein the processor is further configured to: decode the data received to add one or more steps to the prescribed flow program.

12. The system of claim 7, wherein the processor is further configured to: decode the data received to remove one or more steps from the prescribed flow program.

13. A non-transitory computer-readable medium comprising software instructions that, when executed by a computer, causes the computer to perform a method to develop, convey, and execute on a server connected to a network, a relationship marketing campaign directed to target recipients, the method comprising steps of:

receiving, by the server via the network, information regarding one or more target recipients from respective target recipients using computing devices connected to the network and data that prescribes a flow of the campaign from a respective marketing professional using additional computing devices connected to the network;

defining and performing, by the server, steps of a flow program to automatically engage the one or more target recipients, wherein the data prescribes at least (a) target criteria for classifying the one or more target recipients, trigger criteria, to define when the one or more target recipients receive information, and (c) a plurality of branches of the flow program, wherein each branch is defined to, and when performed delivers, different content;

monitoring, by the server, the steps of the flow program to ascertain when the computing devices of the one or more target recipients are engaged;

selecting, by the server, first target recipients from the one or more target recipients who meet the target criteria;

awarding, by the server, a number of points to the first target recipients when the trigger criteria are satisfied, wherein the trigger criteria are satisfied when the first target recipients have completed one or more on-line activities using the respective computing devices, and the number of awarded points is based on the one or more on-line activities completed as indicated by the respective computing devices;

directing, by the server, the steps of the flow program for (a) the first target recipients who have a first number of awarded points down a first branch of the plurality of branches, and (b) the first target recipients who have a second number of awarded points down a second branch of the plurality of branches, wherein the first branch delivers different content than the second branch; and providing, by the server, to the additional computing devices of the marketing professional explanations and visual aid indications regarding the first target recipients that have been directed down each of the plurality of branches.

14. The computer-implemented method of claim 1, further comprising a step of directing the first target recipients to traverse at least one segment of the flow program that matches the first target recipients' response to a survey.

15. The method of claim 1, wherein a first subset of the first target recipients receives different trigger criteria than a second subset of the first-target recipients.

16. The method of claim 1, wherein the data is entered through a drag and drop graphic user interface without requiring computer programming proficiency, and further comprising steps of:

adding and removing one or more steps for communicating with the one or more target recipients from the flow program; and communicating information to the one or more target recipients for the one or more target recipients to respond to the flow program.

17. The system of claim 7, wherein the processor is further configured to direct a first of the one or more target recipients to traverse at least one segment of the flow program that matches the first target recipient's response to a survey.

18. The system of claim 7, wherein a first subset of target recipients receives different trigger criteria than a second subset of target recipients.

19. The system of claim 7, wherein the data is entered through a drag and drop graphic user interface without requiring computer programming proficiency, and further comprising steps of:

adding and removing one or more steps to communicate with the target recipients from the flow program; and communicating information to the one or more target recipients for the target recipients to respond to the flow program.

* * * * *

UNITED STATES PATENT AND TRADEMARK OFFICE
CERTIFICATE OF CORRECTION

PATENT NO. : 10,846,739 B1
APPLICATION NO. : 14/136952
DATED : November 24, 2020
INVENTOR(S) : Hahn et al.

Page 1 of 1

It is certified that error appears in the above-identified patent and that said Letters Patent is hereby corrected as shown below:

In the Claims

Column 18, Claim 13, Line 18, after "recipients," and before "trigger" add "--(b)--".

Column 19, Claim 14, Line 1, after "The" and before "method", delete "computer-implemented".

Signed and Sealed this
Twentieth Day of April, 2021

Drew Hirshfeld
*Performing the Functions and Duties of the
Under Secretary of Commerce for Intellectual Property and
Director of the United States Patent and Trademark Office*